Feb. 3, 1931. E. E. BISHOP 1,791,345
GRADER
Filed March 22, 1929 2 Sheets-Sheet 1

E. E. Bishop, INVENTOR
BY Victor J. Evans
ATTORNEY

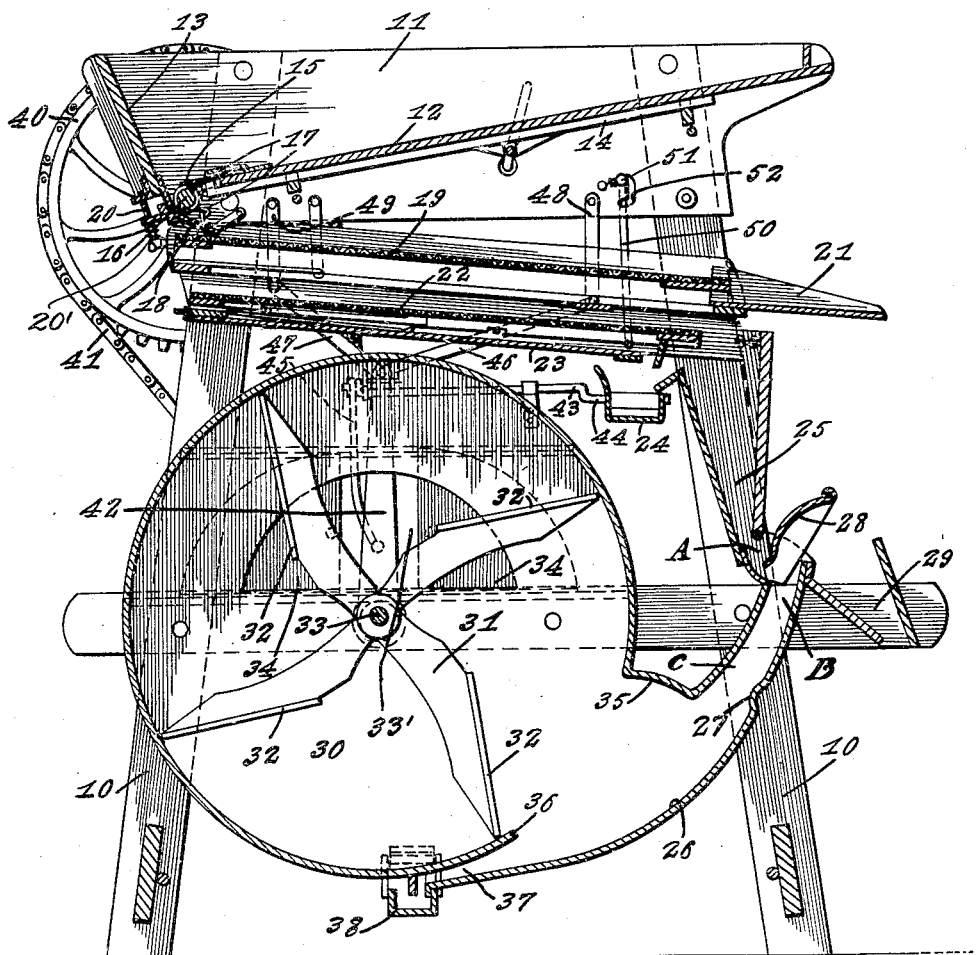

Patented Feb. 3, 1931

1,791,345

UNITED STATES PATENT OFFICE

EVERETT E. BISHOP, OF FARMINGTON, WASHINGTON

GRADER

Application filed March 22, 1929. Serial No. 349,178.

This invention relates to a new and improved grading device for grain and seeds through the process of weight and air and to promote a high standard of seed grain grading without the necessity of using salt or chemical solutions by putting the grain under certain forces produced by mechanical means.

Another object of the invention embodies a multiplicity of sieves over and through which the different grades or weights of grain may pass.

A further object of the invention contemplates the provision of a feeding element within the hopper of the machine to regulate the flow of the grain or seed mixture upon the initial sieve or screen.

An additional object of the invention comprehends a blower construction operable in conjunction with the sieves to separate the under weight and proper weighted sized grain.

More specifically stated the screens or sieves and operating mechanism for the blower are coupled for simultaneous movement whereby the sieved or screened sized grain will be deposited adjacent to and actuate for synchronization with the pulsation of air from the bolwer to effectively discharge the under weight sized grain.

With the above and other objects in view, the invention further consists of the following novel features and details of constructions, to be hereinafter more fully described, illustrated in the accompanying drawings and pointed out in the appended claim.

In the drawings:—

Figure 2 is a vertical sectional view taken through the invention.

Figure 3 is an elevation of a feed member.

Figure 1:
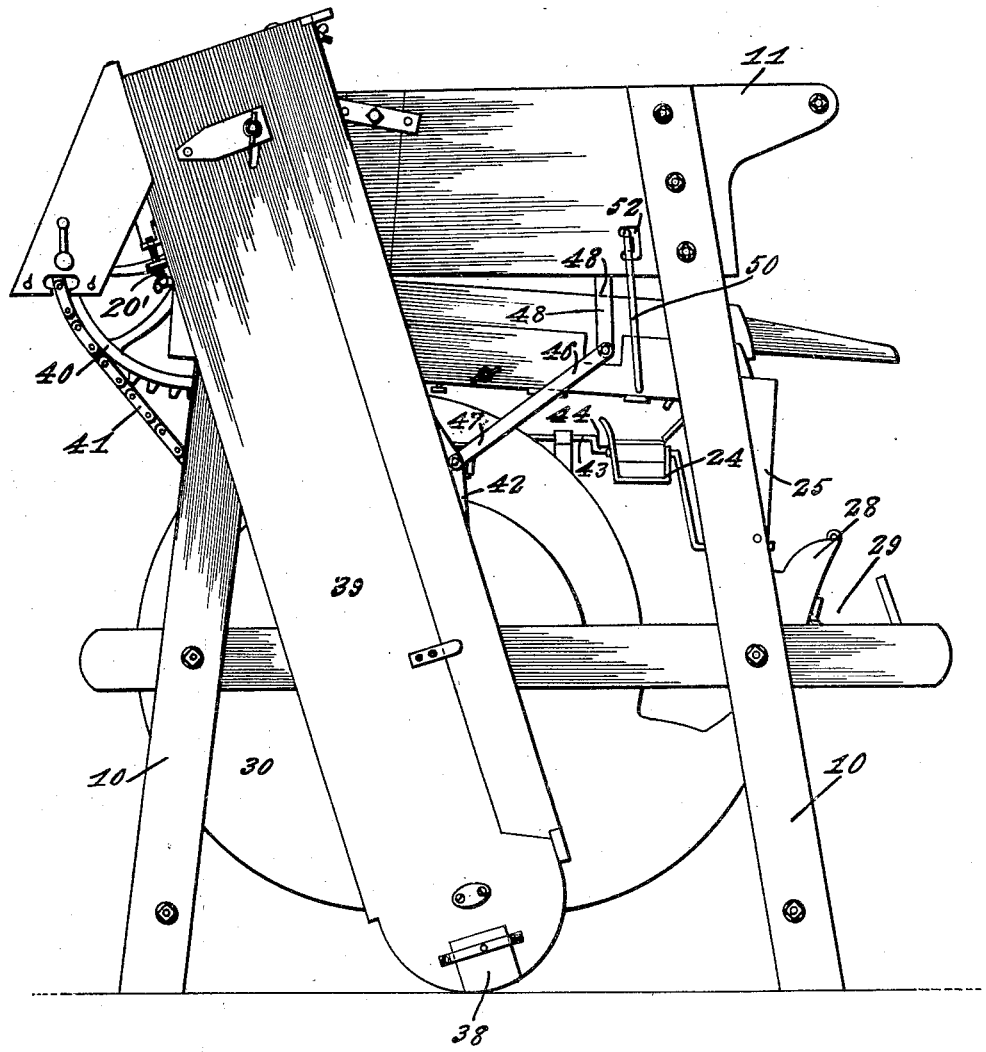
Figure 1 is a side elevation of the invention.

Referring to the drawings in detail, wherein like characters of reference denote corresponding parts, the reference characters 10 indicate the supporting legs or standards for a hopper, such as indicated at 11.

A feeding tray or trough, as indicated at 12, disposed at an inclination between the side walls of the hopper and forming the bottom wall of the latter, has one end thereof spaced from the adjacent inclined side wall 13 of the hopper, substantially as illustrated in Figure 2 of the drawings.

A lever 14, slidably mounted upon the under side of the tray 12, carries an elongated plate 15 upon one end thereof disposed adjacent the lowermost inclined end of the tray to regulate the flow of the grain mixture from the hopper.

An axle 16, horizontally disposed between the side walls of the hopper 11, and beneath the plate 15, is provided with oppositely spiraled fins 17 extending from the center outwardly therefrom and which when rotated in conjunction with said axle will discharge even amounts or layers of the grain upon a table 18. Said table is inclined to facilitate disposition of the measure of grain mixture upon a tray or sieve 19.

A bolt member 20, carried upon the inclined end wall 13 of the hopper 11, also carries the table 18 whereby clearance between the table 18 and the fins 17 may be regulated. A tail board or spout 21, carried upon the outermost end of the tray or sieve 19, is adapted to discharge the coarse dross, such as straws, grain heads, white caps, etc. The grain of normal size and under and small seeds pass through this sieve upon a companion sieve 22 located immediately therebeneath. The grain and small dross that falls through the sieve 19 upon the sieve 22 will be sifted thereby to deposit the dross, such as dirt, weed seeds, cracked or broken kernels and small grains upon a shoe 23; the latter subsequently deposits same upon a moving trough 24. All normal kernels travel over the surface of the sieve 22 and fall into a passageway 25. This passageway serves as a guide for the falling grain as it travels to the intake A of the grading device. The grain passing from the intake A of the grading device, at the discharge end of the passageway 25, will flow or pass across the throat B of a spout C of the grading device, such as indicated at 26.

A convex portion 27 is horizontally disposed within the spout C and upon the inner side wall thereof. The grain travels on the convex surface 27 of the grading wall 26 and upon reaching the center thereof gives the kernels very little bearing surface against the wall whereby the blasts of air through the spout C separate the proper weight size kernels from the under weight kernels. The latter will pass through the throat B and the air outlet 28 which is curved upon itself to guide the under weight kernels into a trap 29. A blower housing or compartment 30, having communication with the spout C and utilizing the grading wall 26 as a portion thereof, houses a fan or other draft creating device, generally designated as at 31, and which employs fan blades 32 set approximately at angles of 17° off center with relation to the fan axis 33.

An air intake 33' for the cylinder or housing 30 admits only that quantity of air permitted by the shutters 34 thereby regulating the grading capacities for grains and seeds that are by nature of different weights. The angularity of the blades 32 of the fan or blower crowds the air toward the bottom of the housing or compartment 30 and forces the blast of air between the adjacent blades into the spout C on a horizontal rather than a perpendicular line.

A blast plate, such as indicated at 35, of curvilinear formation and disposed between the adjacent connecting portions of the housing or compartment 30 and the spout C therefor, directs the upper air currents to a point just below the convex surface 27 upon the grading wall 26. The bottom wall of the compartment or housing 30 is provided with a fin or extension 36 arranged in spaced superimposed relation with respect to the adjacent surface of the grading wall 26, as shown in Figure 2 of the drawings, whereby the full weight sized grain may pass through the grain outlet 37 for subsequent discharge upon the trough 38. A bagging elevator 39, having connection with the trough 38, provides the means of conveying the thoroughly separated sized and weighed kernels. The under weight kernels are picked up and carried by the wind stream to the air outlet 28. The air pressure breaking down or being greatly reduced at this point allows the under weight kernels to fall into the trap 29. Said trap also prevents the under weight kernels from being mixed with the dross falling from the tail board 21.

A sprocket wheel 40, fixed upon one end of the axle 16, exteriorly of the hopper 11, operates a chain 41 having connection at its opposite end with a gear, not shown, upon the axis 33 of the fan.

A crank arm 42, eccentrically mounted upon the axis 33 for the fan or blower exteriorly of the housing or compartment 30 therefor, is adapted for reciprocating action in a vertical plane. A rod 43, having an offset portion 44 upon one end connected with the moving trough 24, is adapted for connection at its opposite correspondingly shaped end with a connecting rod 45 actuated in conjunction with the crank arm 42.

Drag links 46 and 47, pivotally connected with the uppermost projecting end of the crank arm 42, are upwardly and outwardly obliquely disposed in opposite directions therefrom for connection with pivoted links 48 and 49 included upon the hopper 11 beneath the tray 12. The drag links 46 and 47 are in addition connected with the outer sides of the screens or sieves 19 and 22 respectively to impart oscillatory movement thereto whereby the grain mixture will be adequately sifted.

An adjustment for the sieve or screen 22 in the nature of a rod 50 having connection at its lowermost end with the tilted end of the screen or sieve 22 adjacent the moving trough 24 has the uppermost offset and 51 therefor slidably mounted within a U-shaped slot 52 in the side wall of the hopper 11. By such adjustment the sized kernels and contamination of weed seeds, dirt, particles of straw etc., will require a longer sifting process to relieve such burden from the blower apparatus.

Certain agricultural experiment stations have found through various tests that grain can be graded by weight by using the proper liquid solutions. Invariably, the heavier kernels when planted showed a more uniform and higher percentage of germination than did the under weight berries. Both the heavy and under weight kernels, receiving the same treatment, proved the germinating strength was in accordance to the weight of the kernel and not due to any chemical action. It also was found that kernels that looked alike in shape and size varied considerably in weight. Further tests showed a marked difference in crop results where the seed had been graded by weight and that which had been graded by size. That which had been graded by weight produced a more even stand, averaged more stalks from one seed kernel, and was more resistant toward certain diseases. Tests covering a period of years gave weight grading a lead over size grading through a noticeable increase in yield per acre.

While proving that grading by weight was superior to grading by size, it was also found that utmost care must be taken for fear that the seed be injured by solution. By lack of knowledge and inexperience in making and handling this solution for various grains makes it an impractical method of grading for the average grower.

The present invention promotes a high standard of seed grain grading without the necessity of using salt or chemical solutions. By subjecting the grain to certain forces produced by a mechanical means, the same weight results, as the solution method of grading, is facilitated.

As shown, the bolt 20 is passed through a compression spring 20′ to yieldingly retain the table 18 in position for use and to permit passage of large objects thereover, as discharged by the feed member 17, whereby breakage of the table 18 will be prevented.

The invention is susceptible of various changes in its form, proportions and minor details of construction, and the right is herein reserved to make such changes as properly fall within the scope of the appended claim.

Having thus described the invention, what is claimed is:—

A grader comprising hopper having the bottom wall therefor obliquely inclined toward the lower end of the deeper end wall thereof and spaced therefrom, an axle horizontally disposed and journaled between the side walls of the hopper and projected throughout the major portion of its length between the end wall and bottom wall, said axle having fins to discharge even amounts of grain in layers from the hopper, a lever slidably mounted beneath the bottom wall and projected an appreciable distance beyond the spaced end thereof, an elongated plate carried upon the projecting end of the lever and disposed in juxtaposition to the axle to regulate the flow of the grain mixture downwardly from the hopper upon the axle, and a table adjustably arranged beneath the axle and hopper to facilitate further spreading of the discharge layers of grain.

In testimony whereof I affix my signature.

EVERETT E. BISHOP.